(12) United States Patent
Rangel et al.

(10) Patent No.: US 11,046,269 B2
(45) Date of Patent: Jun. 29, 2021

(54) VEHICLE BUMPER ASSEMBLY

(71) Applicant: Nissan North America, Inc., Franklin, TN (US)

(72) Inventors: Alejandro Rangel, State of Mexico (MX); Juvenal Vite, State of Mexico (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 91 days.

(21) Appl. No.: 16/472,125

(22) PCT Filed: Mar. 17, 2017

(86) PCT No.: PCT/US2017/023028
§ 371 (c)(1),
(2) Date: Jun. 20, 2019

(87) PCT Pub. No.: WO2018/169552
PCT Pub. Date: Sep. 20, 2018

(65) Prior Publication Data
US 2020/0101913 A1   Apr. 2, 2020

(51) Int. Cl.
*B60R 19/18* (2006.01)
*B60R 19/03* (2006.01)
(Continued)

(52) U.S. Cl.
CPC ............ *B60R 19/18* (2013.01); *B60R 19/023* (2013.01); *B60R 19/03* (2013.01); *B60R 19/12* (2013.01);
(Continued)

(58) Field of Classification Search
CPC ....... B60R 19/02; B60R 19/023; B60R 19/12; B60R 19/18; B60R 19/22
(Continued)

(56) References Cited

U.S. PATENT DOCUMENTS 6,435,577 B1   8/2002   Renault
6,817,638 B1   11/2004  Choi et al.
(Continued)

FOREIGN PATENT DOCUMENTS

JP   2006021601 A       1/2006
JP   2009061831 A       3/2009
JP   2009061831 A  *    3/2009

OTHER PUBLICATIONS

International Preliminary Report on Patentability in PCT/US2017/023028 dated May 15, 2019.
(Continued)

*Primary Examiner* — Jason S Daniels
(74) *Attorney, Agent, or Firm* — Global IP Counselors, LLP

(57) ABSTRACT

A vehicle bumper assembly (12) that includes a first energy absorbing member (22), a second energy absorbing member (24) and a vehicle facia member (26). The first energy absorbing member (22) is made of non-expanded polypropylene and is configured to directly attach to a vehicle body structure (14). The second energy absorbing member (24) is made of expanded polypropylene and is directly attached to a portion of the first energy absorbing member (22) spaced apart from the vehicle body structure (14). The vehicle facia member (26) is shaped and contoured for a predetermined vehicle body style. Further, the vehicle facia member (26) is configured to attach to the vehicle body structure (14). The vehicle facia member (26) covers and at least partially conceals the first energy absorbing member (22) and the second energy absorbing member (24).

11 Claims, 7 Drawing Sheets

(51) Int. Cl.
 *B60R 19/02* (2006.01)
 *B60R 19/12* (2006.01)
(52) U.S. Cl.
 CPC ............... *B60R 2019/1866* (2013.01); *B60R 2019/1873* (2013.01); *B60R 2019/1886* (2013.01)
(58) Field of Classification Search
 USPC .................................................. 293/120, 122
 See application file for complete search history.

(56) References Cited

U.S. PATENT DOCUMENTS

| | | | |
|---|---|---|---|
| 7,044,514 B2* | 5/2006 | Mustafa | B60R 19/22 |
| | | | 293/109 |
| 2004/0174024 A1* | 9/2004 | Murata | B60R 19/18 |
| | | | 293/109 |
| 2006/0043743 A1* | 3/2006 | Shuler | B60R 19/12 |
| | | | 293/120 |
| 2007/0284895 A1 | 12/2007 | Toneatti et al. | |
| 2007/0284896 A1 | 12/2007 | Wakabayashi et al. | |
| 2010/0090499 A1 | 4/2010 | Shepard et al. | |
| 2013/0193698 A1 | 8/2013 | Nagwanshi et al. | |
| 2013/0257069 A1* | 10/2013 | Roberts | B60R 19/22 |
| | | | 293/120 |
| 2016/0207482 A1* | 7/2016 | Tachibana | B60R 19/18 |

OTHER PUBLICATIONS

International Search Report in PCT/US2017/023028 dated Jun. 1, 2017.
Written Opinion, dated Jun. 1, 2017.

* cited by examiner

VEHICLE BUMPER ASSEMBLY

CROSS-REFERENCE TO RELATED APPLICATIONS

This application is a U.S. National Stage application of International Application No. PCT/US2017/023028, filed Mar. 17, 2017.

BACKGROUND

Field of the Invention

The present invention generally relates to a vehicle bumper assembly. More specifically, the present invention relates to a vehicle bumper assembly that includes a first energy absorbing member made of a first material and a second energy absorbing member made, of a second material that has different impact response as compared to the first material.

Background Information

Conventional vehicle bumper assemblies usually include an energy absorbing material covered by a vehicle fascia.

SUMMARY

One object of the present disclosure is to provide a vehicle bumper assembly with a first energy absorbing member that is made of a first material and a second energy absorbing material that is, made of a second material having different energy absorbing characteristics as compared to those of the first material.

In view of the state of the known technology, one aspect of the present disclosure is to provide a vehicle bumper assembly with a first energy absorbing member, a second energy absorbing member and a vehicle facia member. The first energy absorbing member is made of non-expanded polypropylene and is configured to directly attach to a vehicle body structure. The second energy absorbing member is made of expanded polypropylene and is directly attached to a portion of the first energy absorbing member spaced apart from the vehicle body structure. The vehicle facia member is shaped and contoured for a predetermined vehicle body style. Further, the vehicle facia member is configured to attach to the vehicle body structure. The vehicle facia member cover and at least partially conceals the first energy absorbing member and the second energy absorbing member.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
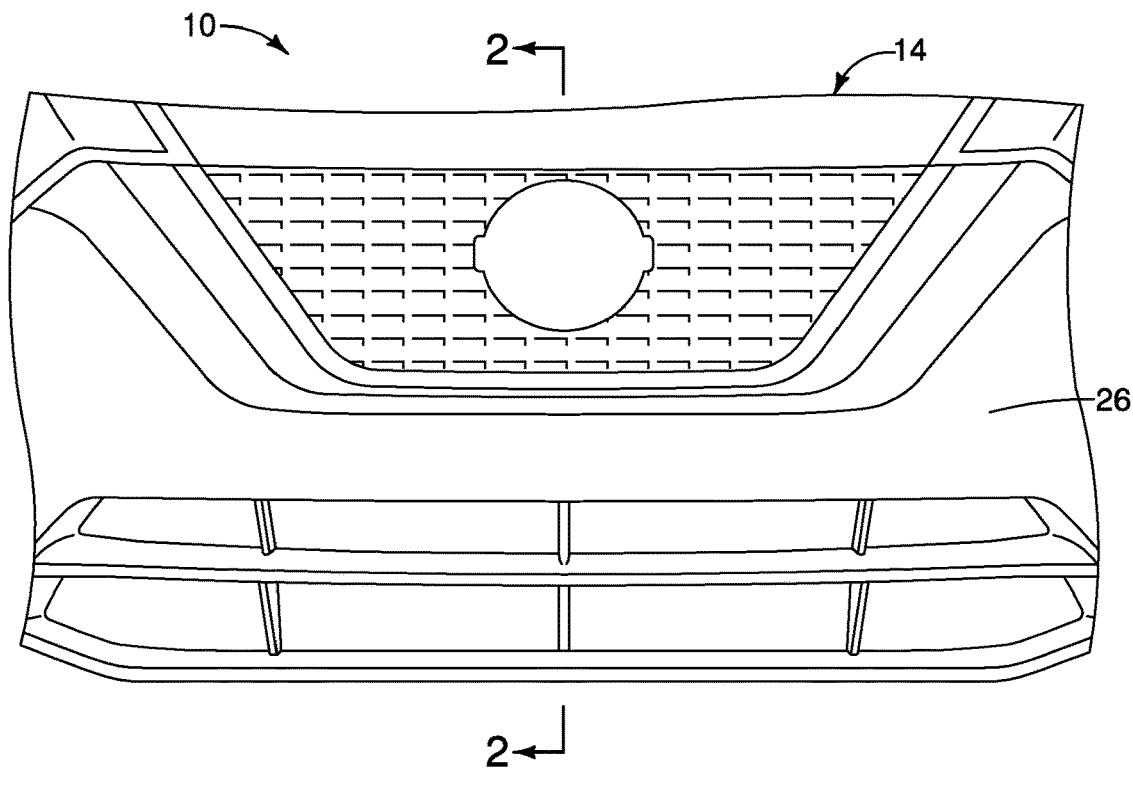
FIG. 1 is a front view of a vehicle that includes a vehicle bumper assembly in accordance with a first embodiment.

Referring initially to FIG. 1, a vehicle 10 that includes a vehicle bumper assembly 12 (shown in FIGS. 2-4) is illustrated in accordance with a first embodiment. The vehicle 10 also includes a vehicle, body structure 14 that includes many conventional structural and support elements. Since vehicle body structures and support elements are well known, further description is omitted for the sake of brevity.

Figure 2:
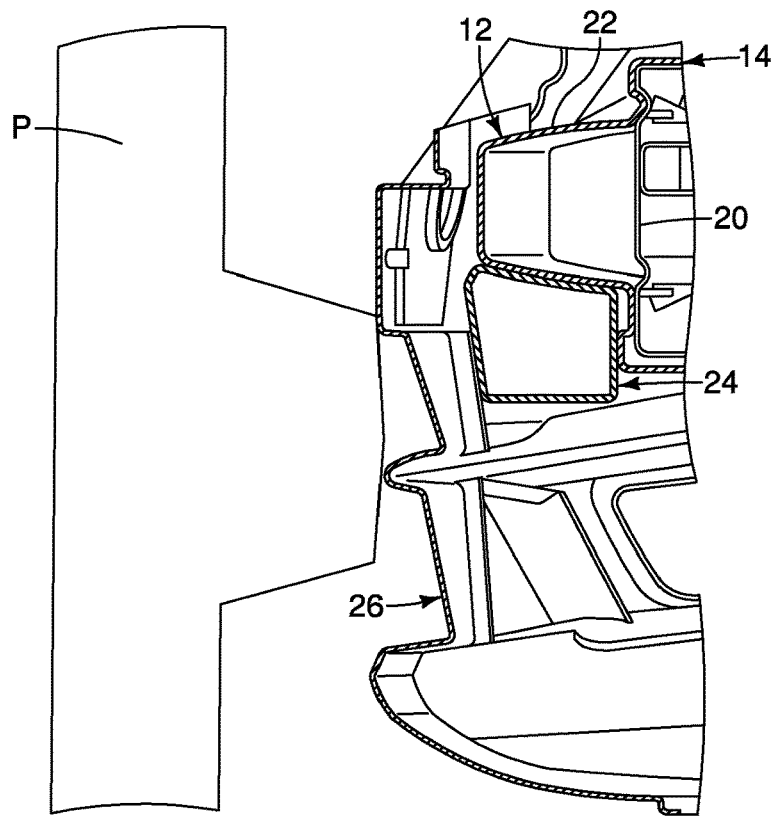
FIG. 2 is a side cross-sectional view of the vehicle and the vehicle bumper assembly taken Mona the line 2-2 in FIG. 1 in accordance with the first embodiment.

The vehicle body structure 14 supports the vehicle bumper assembly 12. Specifically, in the depicted embodiment, the vehicle bumper assembly 12 is attached to a front end of the vehicle body structure 14, as shown in FIGS. 1 and 2. However, it should be understood from the drawings and the description herein that the vehicle bumper assembly 12 can also be attached to a rear end of the vehicle body structure 14.

Figure 3:
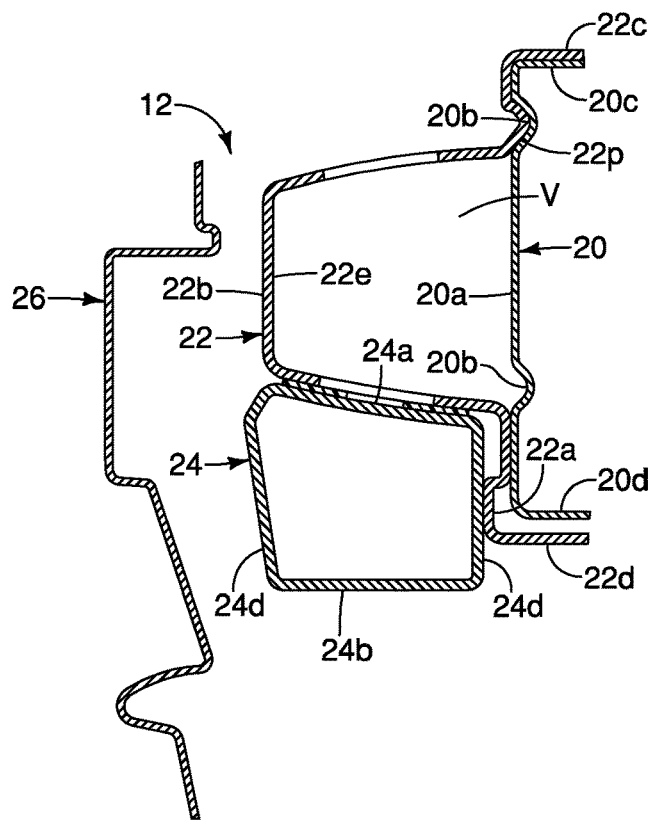
FIG. 3 is a side cross-sectional view of the vehicle bumper assembly showing a rigid support member, a first energy absorbing member, a second absorbing member and a vehicle facia member in accordance with the first, embodiment.
Figure 4:
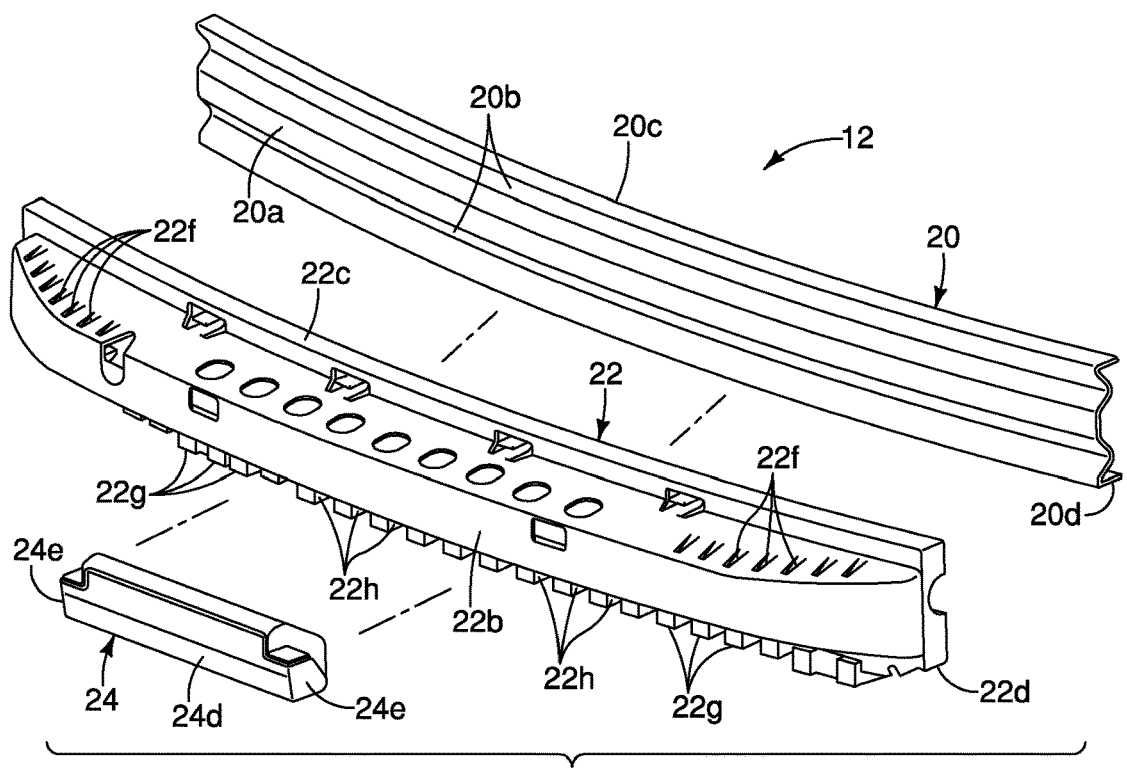
FIG. 4 is an exploded perspective view of the vehicle bumper assembly showing features of the rigid support member, the first energy absorbing member and the second absorbing member in accordance with the first embodiment.

As shown in FIGS. 3 and 4, the vehicle bumper assembly 12 (hereinafter referred to as the bumper assembly 12) includes a rigid support member 20, a first energy absorbing member 22, a second energy absorbing member 24 and a vehicle facia member 26.

The rigid support member 20 can be made of steel, metal alloys, composite materials, or any other rigid materials that can be formed or shaped into a beam, such as the depicted shape of the rigid support member 20, as shown in FIGS. 3 and 4. The rigid support member 20 is fixedly attached to the vehicle body structure 14 via welding techniques and/or mechanical fasteners. The rigid support member 20 can be a dedicated part of the bumper assembly 12, or can be pre-existing element of the vehicle body assembly 14.

The rigid support member 20 includes a main wall portion 20a that is formed with a pair of recesses 20b that extend from a first lateral end of the rigid support member 20 to a second lateral end of the rigid support member 20. The rigid support member 20 further has an upper wall 20c and a lower wall 20d. When installed to the vehicle body structure 14, the rigid support member 20 extends from proximate a first lateral or outboard side of the vehicle body structure 14 to a second lateral or outboard side of the vehicle body structure 14. The main wall portion 20a faces in a forward direction relative to the vehicle 10. The rigid support member 20 is specifically shaped to support the first energy absorbing member 22, as described in greater detail below.

The first energy absorbing, member 22 is a molded structure that is homogeneously formed as a single monolithic element. In the depicted embodiment the first energy absorbing member 22 is made of non-expanded polypropylene and is configured to directly attach to the rigid support member 20. The first energy absorbing member 22 is a solid form of polypropylene with few, if any, inclusions or air bubbles. Preferably, the first energy absorbing member 22 is homogenous and completely solid.

The first energy absorbing member 22 can be made from sheets of polypropylene that are molded into the depicted shape, or can be made using, for example, and an injection molding process. The first energy absorbing member 22 includes an inboard facing surface 22a, an outboard facing surface 22b, an upwardly facing surface 22c and a downward facing surface 22d. The inboard facing surface 22a is attached to the rigid support member 20 via mechanical fasteners (not shown) and/or adhesive material. The inboard facing surface 22a faces in a rearward direction relative to the vehicle 10. The outboard facing surface 22b is opposite the inboard facing surface 22a and faces in a forward direction relative to the vehicle 10. As well, the outboard facing surface 22b faces, the vehicle facia member 26. The downwardly facing surface 22d is located below a portion of the outboard facing surface 22b, as shown in FIG. 3.

A portion of the upwardly facing surface 22c includes a plurality of dimples or recesses 22f that provide the first energy absorbing member 22 with added stiffness. The downwardly facing surface 22d is formed with a plurality of projecting portions 22g with gaps 22h being defined between adjacent ones of the projecting portion 22g.

The first energy absorbing member 22 is formed as a sheet-like constructor or partial shell, as shown in FIG. 3. Specifically, a portion 22e of the inboard facing surface 22a is spaced apart from the rigid support member 20 creating a space or void V therebetween. The first energy absorbing member 22 can be attached to the rigid support member 20 by, for example, mechanical fasteners (not shown), mechanical clips (not shown) or the above mentioned adhesive material. In the depicted embodiment, the first energy absorbing member 22 conforms to the overall shape of the rigid support member 20 such that, projections 22p formed along the inboard facing surface 22a mate with at least one of the recesses 20b of the rigid support member 20, and that portion of the first energy absorbing member 22 that defines the upwardly facing surface 22c overlays the upper wall 20c of the rigid support member 20, as shown in FIG. 3.

The second energy absorbing member 24 is made of expanded polypropylene. Consequently, the second energy absorbing member 24 includes gas-bubbles and/or tiny voids. The second energy absorbing member 24 is directly attached to a portion of the first energy absorbing member 22 such that the second energy absorbing member 24 is spaced apart from the rigid support member 20 and is completely spaced apart from the vehicle body structure 14. Further, when the vehicle bumper assembly 12 is fully assembled on the vehicle 10, the second energy absorbing member 24 is positioned between the first energy absorbing member 22 and the vehicle facia member 26.

Figure 11:
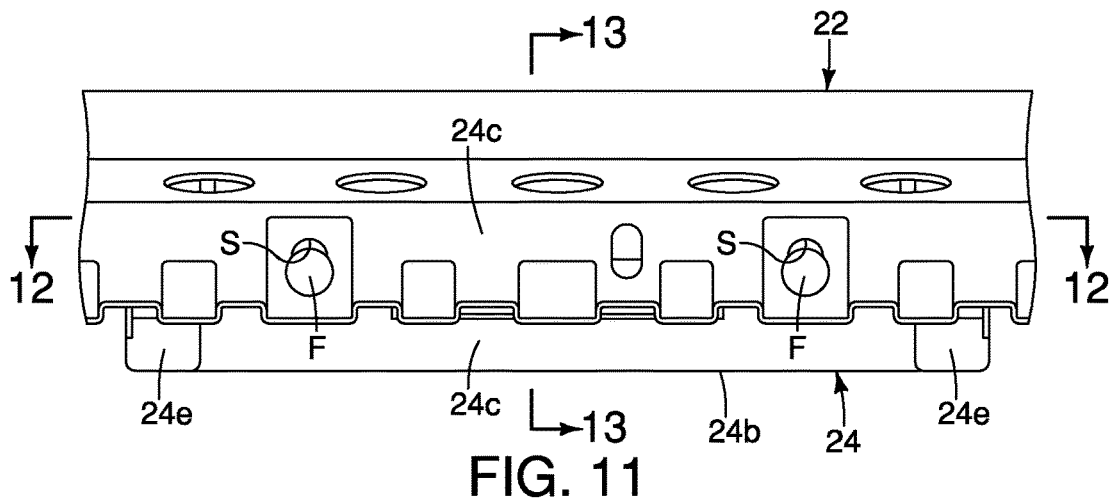
FIG. 11 is a rear view of a central portion of the vehicle bumper assembly showing an area of the first energy absorbing member with the mechanical fasteners attaching to the second energy absorbing member in accordance with the first embodiment.
Figure 12:
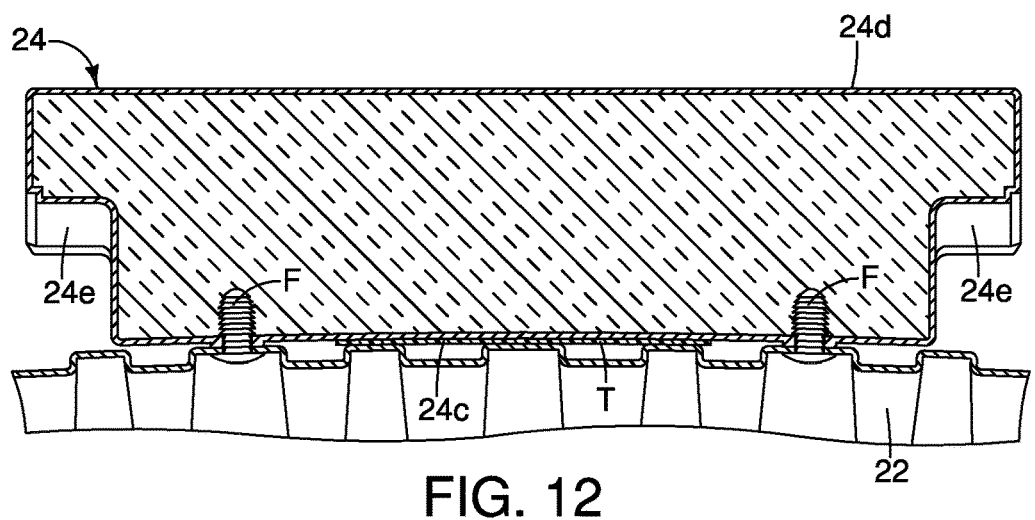
FIG. 12 is a cross-sectional view of the vehicle bumper assembly taken along the lines 12-12 in FIG. 11, showing the first energy absorbing member with the mechanical fasteners attaching to the second energy absorbing member in accordance with the first embodiment.
Figure 13:
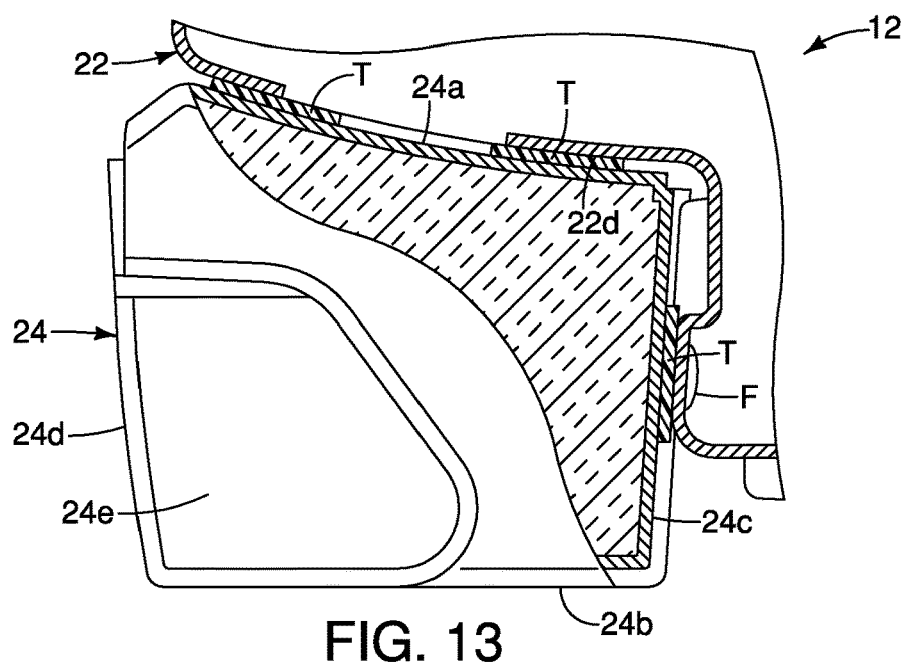
FIG. 13 is a partial cross-sectional view of the vehicle bumper assembly taken along the lines 13-13 in FIG. 11, showing the second energy absorbing member attached to the first energy absorbing, member via double sided adhesive tape in, accordance with the first embodiment.

The second energy absorbing member 24 is a block-like member that includes an upper surface 24a, a lower surface 24b, an inboard or rearwardly facing surface 24c and an outboard or forwardly facing surface 24d. Each of lateral end, or side surfaces of the second energy absorbing member 24 include, protrusions 24e. As shown in FIGS. 11-13, the second energy absorbing member 24 is attached to the first energy absorbing member 22 by a mechanical fastening structure that includes mechanical fasteners F. The mechanical fastening structure includes the first energy absorbing, member 22 having slots S (FIG. 11). Each of the mechanical fastener F has a head or clip end that extends through the slots S and into openings in the second energy absorbing member 24, as shown in FIG. 12. Additionally, the second energy absorbing member 24 can also be attached to the first energy absorbing member 22 is by an adhesive material in the depicted embodiment, the second energy absorbing member 24 includes several sections of double-sided adhesive tape T, as shown in FIGS. 7-8 and 10-13. In the depicted embodiment, there are two sections of the double-sided adhesive tape T installed to the upper surface 24a and one section of the double-sided adhesive tape T installed to the inboard or rearwardly facing surface 24c. Hence, the upper surface 24a of the second energy absorbing member 24 attaches to a portion of the downward facing surface 22d of the first energy absorbing member 22, and the rearwardly facing surface 24c attaches to a portion of the outboard facing surface 22b of the first energy absorbing member 22.

The second energy absorbing member 24 is dimensioned and shaped such that the rearwardly facing surface 24c (the inboard surface) of the second energy absorbing member 24 contacts the first energy absorbing member 22. Further, the forwardly facing surface 24d (the outboard surface) of the second energy absorbing member 22 faces and can contact the vehicle facia member 26 in response to an impact event.

The vehicle facia member 26 is a conventional vehicle component that is configured to attach to opposite lateral sides of the vehicle body structure 14 covering and at least partially concealing the first energy absorbing member 22 and the second energy absorbing member 24. The vehicle facia member 26 is also configured to attach to a portion of the vehicle body structure 14 above the first energy absorbing member 22 and the second energy absorbing member 24. The vehicle facia member 26 is shaped and contoured to provide the vehicle 10 with a predetermined appearance and style. However, it should be understood from the drawings and the description herein that the vehicle facia member 26 is not limited to the appearance and shapes depicted in FIGS. 1 and 2, but can be provided with alternative shapes and contours depending upon the overall design of the vehicle 10.

Figure 5:
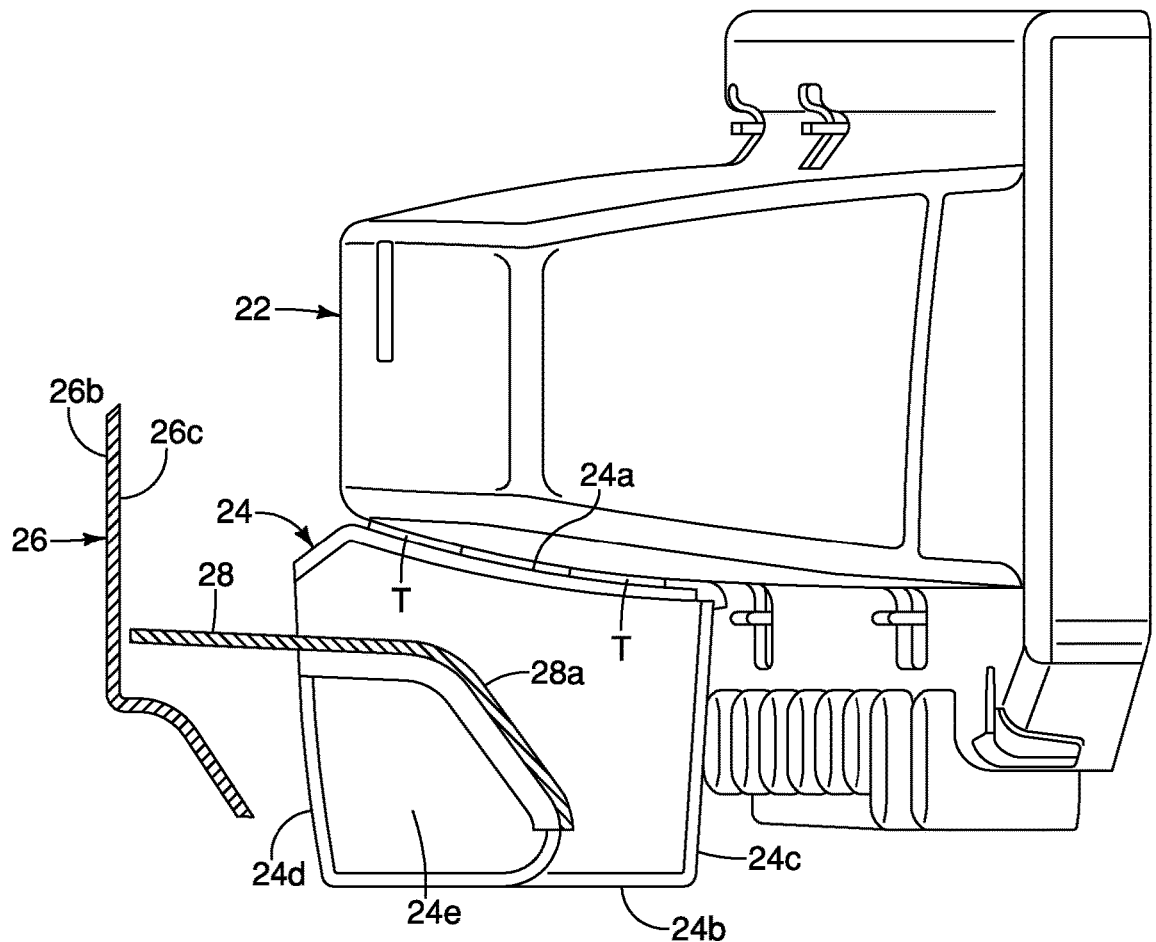
FIG. 5 is a side view of portions of the vehicle bumper assembly showing attachment between the vehicle facia member and the second energy absorbing member in accordance with the first embodiment.
Figure 6:
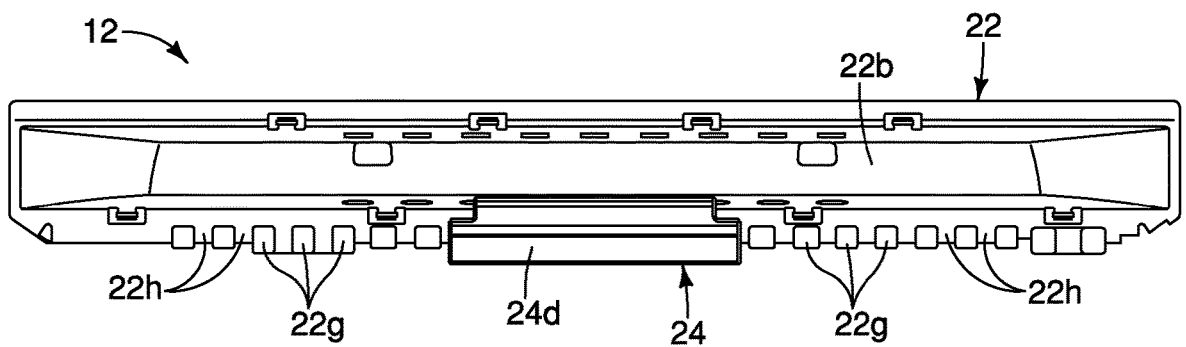
FIG. 6 is a front view of the first energy absorbing member and the second energy absorbing member shown removed from the vehicle in accordance with the first embodiment.
Figure 7:
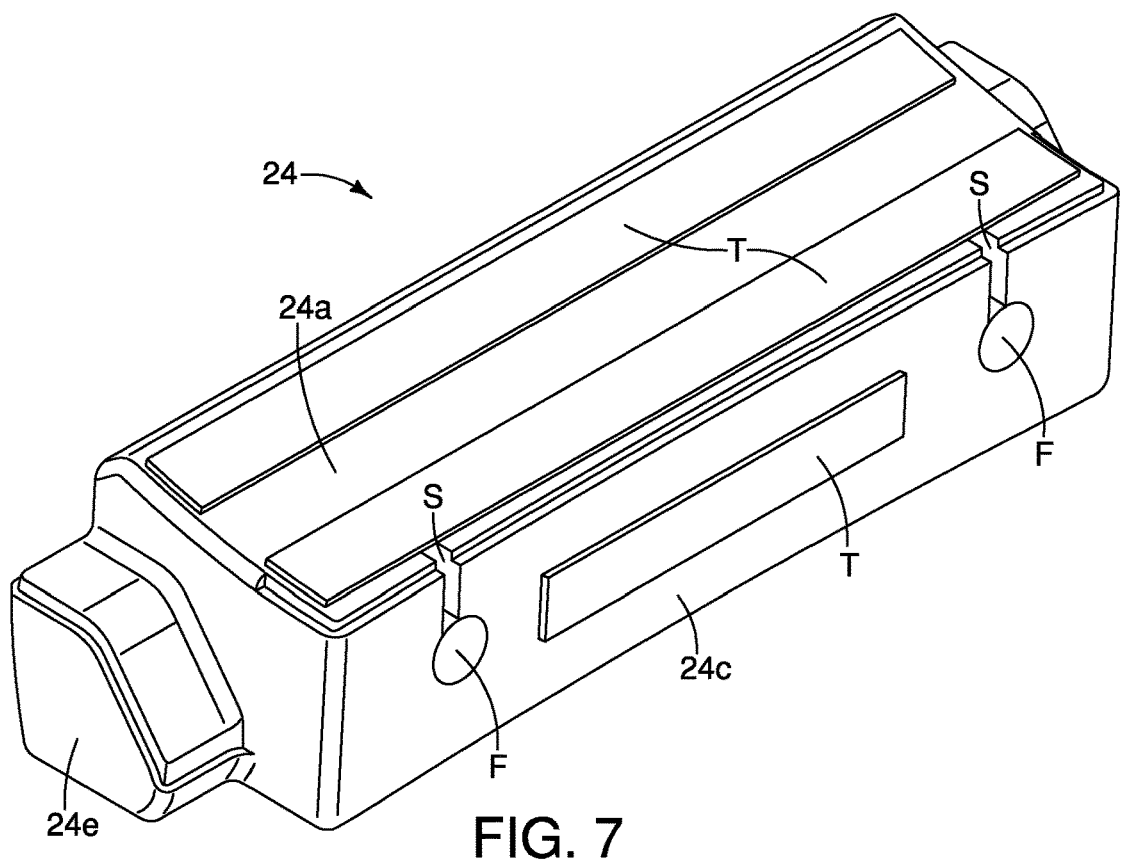
FIG. 7 a perspective view of the second energy absorbing, member shown removed from the vehicle bumper assembly showing a rearward surface thereof along, with side protrusions, double sided adhesive tape and mechanical fasteners in accordance with the first embodiment.
Figure 8:
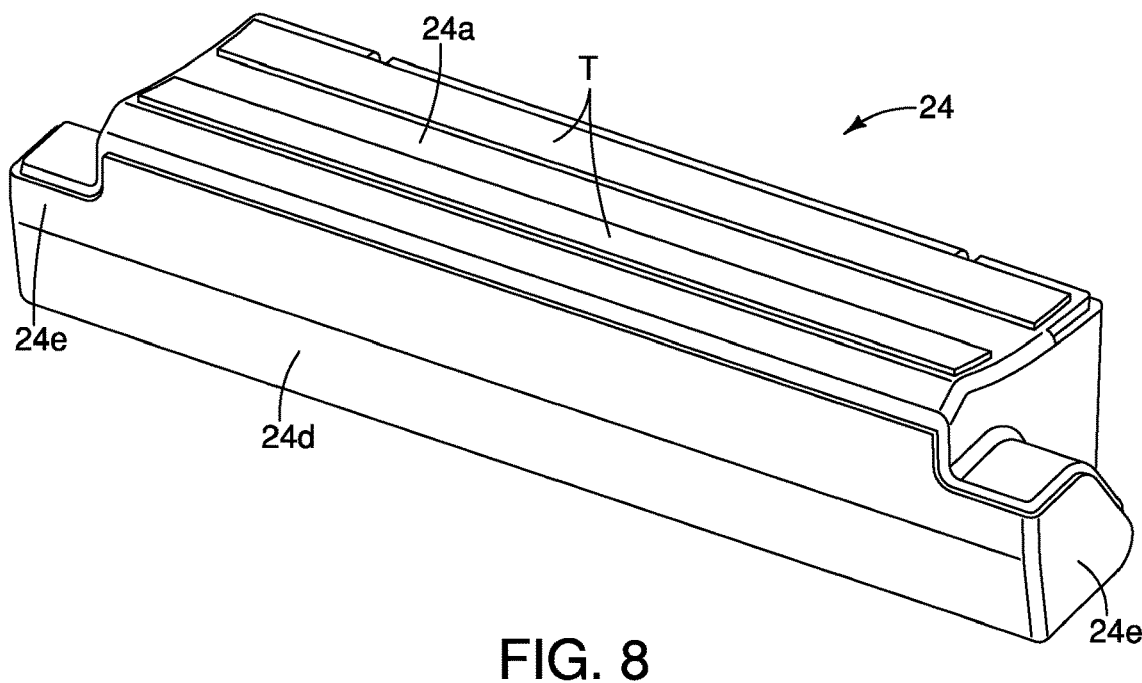
FIG. 8 is another perspective view of the second energy absorbing member shown removed from the vehicle bumper assembly showing a forward surface thereof along with the side protrusions and double sided adhesive tape in accordance with the first embodiment.
Figure 9:
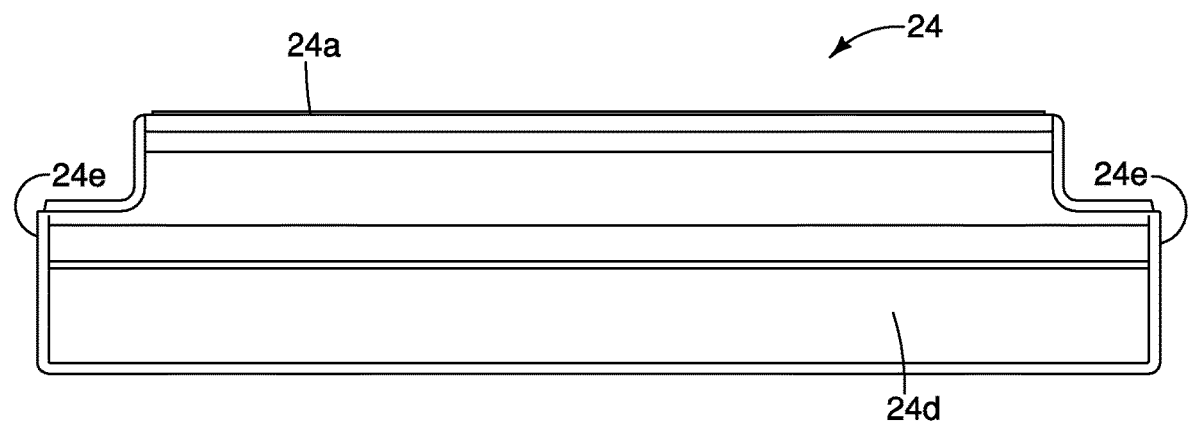
FIG. 9 a bottom view of the second energy absorbing member shown removed from the vehicle bumper assembly in accordance with the first embodiment.
Figure 10:
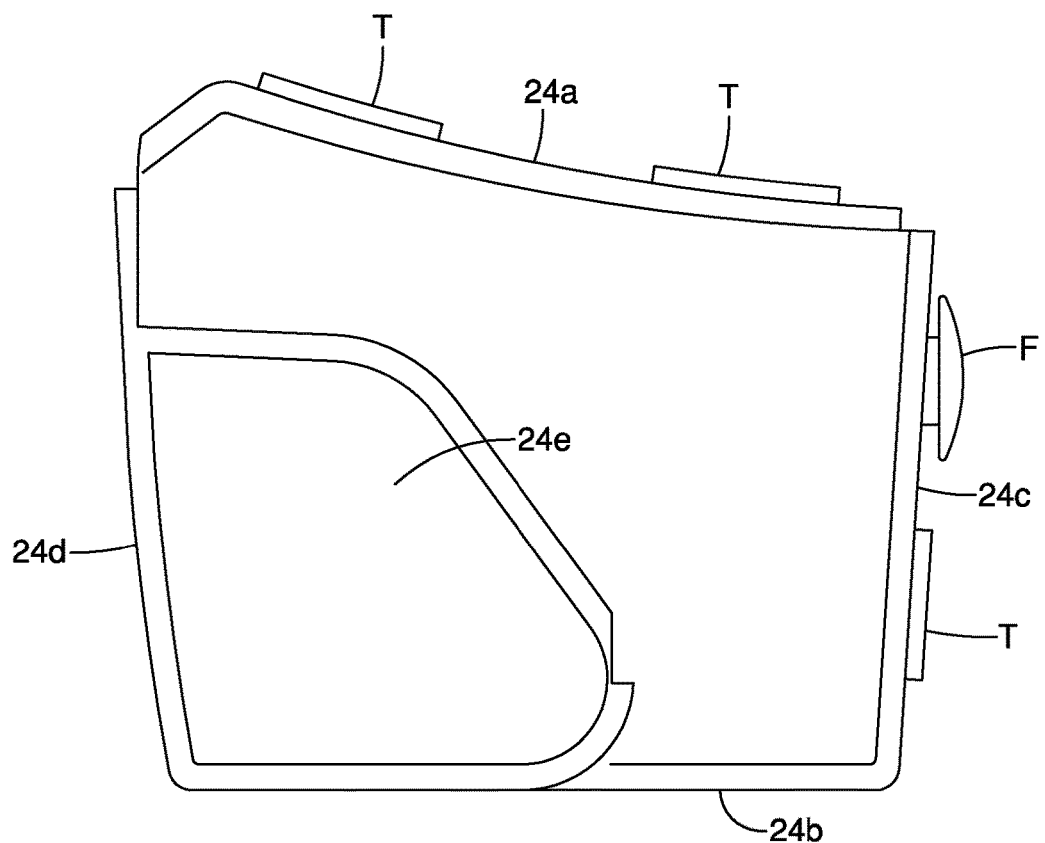
FIG. 10 is a side view of the second energy absorbing member shown removed from the vehicle bumper assembly in accordance with, the first embodiment.
Figure 14:
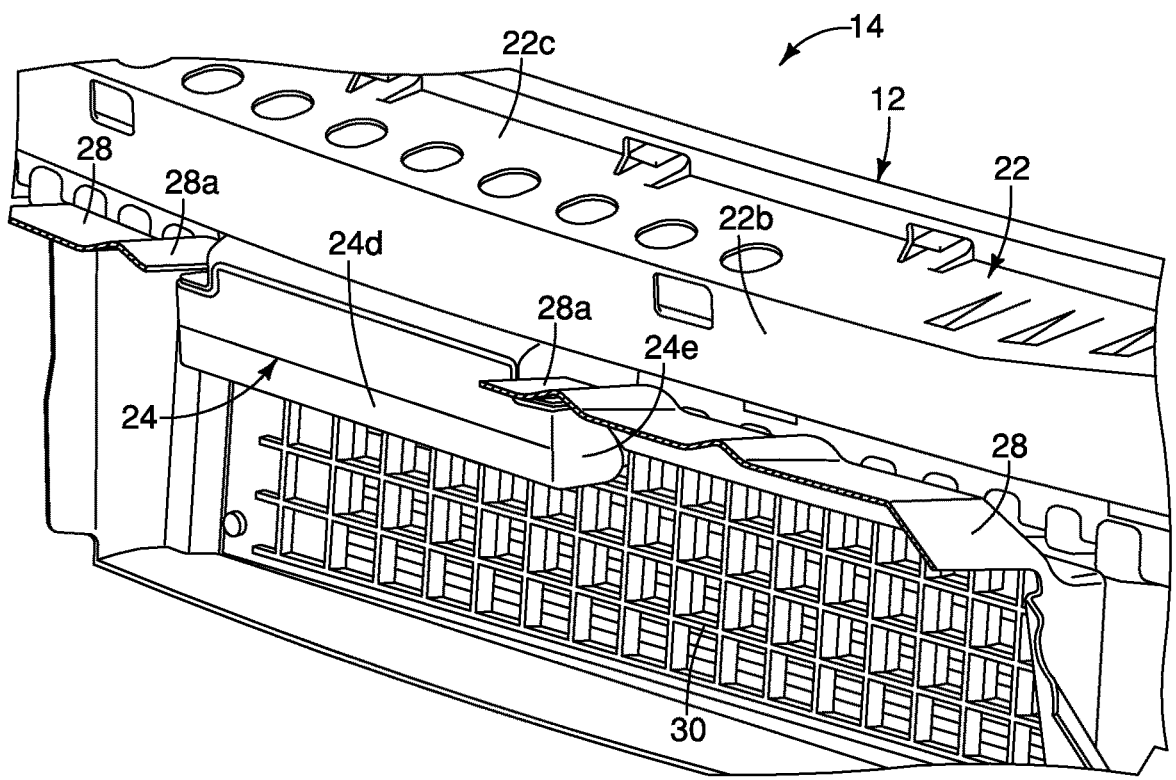
FIG. 14 is a perspective cross-sectional view showing a portion of the vehicle facia member attaching to the second energy absorbing member and portions of the vehicle body structure of the vehicle in accordance with the first embodiment.
Figure 15:
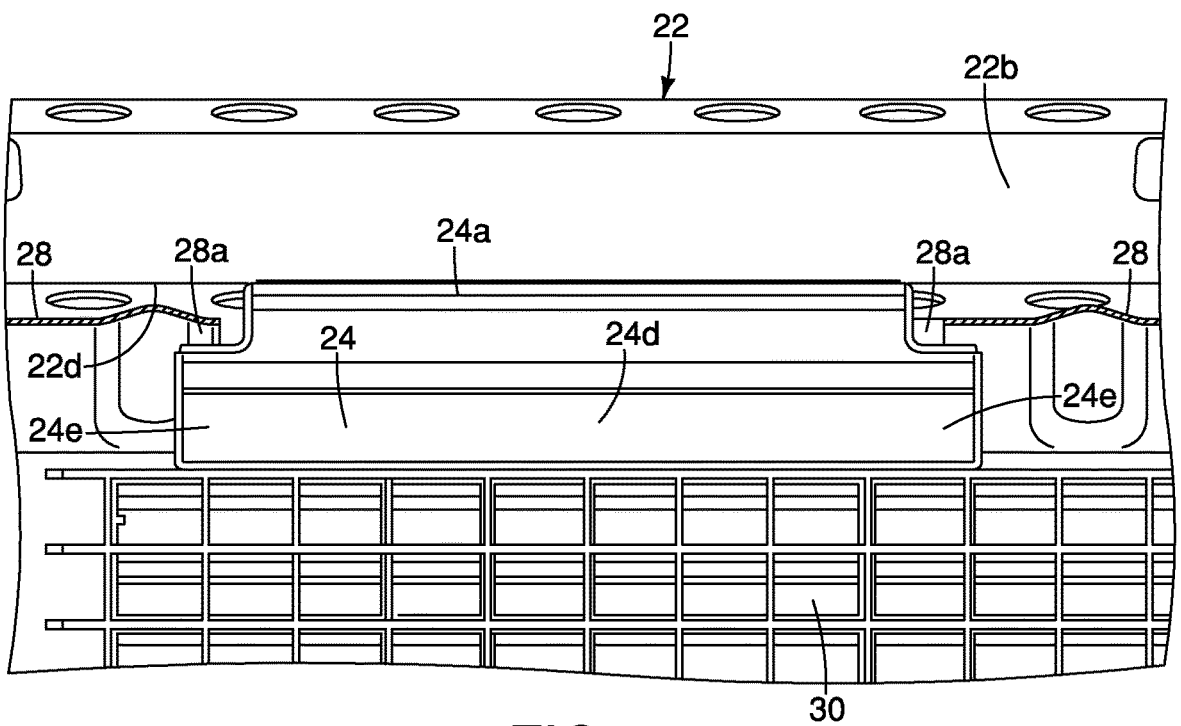
FIG. 15 is a front cross-sectional view of the vehicle bumper assembly showing the portion of the vehicle facia member extending over the protrusions of the second energy absorbing member in accordance with the first embodiment.

The vehicle body structure 14 also includes an air guide 28. As shown in FIGS. 5, 14 and 15, the air guide 28 is a panel or flange that extends rearward from adjacent to the vehicle fascia member 26 toward the first and second energy absorbing members 22 and 24 and includes a pair of hook structures 28a. The vehicle facia member 26 further defines a forward-facing surface 26b and a rearward-facing surface 26c. The air guide 28, and the hook structures 28a extend from an area adjacent to the rearward facing surface 26c such that the hook structures hook on to respective ones of the protrusions 24e, as shown in FIG. 5. The hook structures 28a help to retain the air guide 28 in position relative to the first and second energy absorbing members 22 and 24. However, the vehicle air guide 28 is secured to the vehicle body structure 14 via mechanical fasteners in a conventional manner at locations (not shown) on either side of a radiator 30 of the vehicle body structure 14 and/or at locations (not shown) above the radiator 30 of the vehicle body structure 14. The air guide 28 is shaped and located to direct airflow to and through fins of the radiator 30 in a conventional manner. Since air guides, such as the air guide 28 are conventional features, further description is omitted for the sake of brevity.

As mentioned above, the first energy absorbing member 22 is made of polypropylene (solid or non-expanded polypropylene) and the second energy absorbing member 24 is made of expanded polypropylene. Hence, the first energy absorbing member 22 exhibits a first compression characteristic and the second energy absorbing member 24 exhibits a second compression characteristic such that the first compression characteristic exhibits greater rigidity that the second compression characteristic. In other words, the second energy absorbing member 24 is more easily compressed than the first energy absorbing member 24. In a preferred configuration, the first energy absorbing member 22 exhibits a compression yield strength of approximately 40 MPa in a compression yield strength test, and the second energy absorbing member 24 exhibits a compression yield strength of between 0.10 MPa and 2.08 MPa in a compression yield strength test depending upon the density range of the expanded polypropylene. In the depicted embodiment, the density range of the expanded polypropylene of the second energy absorbing member 24 is, between 20 g/l (grams per liter) to 90 g/l.

Referring to FIG. 2, a testing structure or pendulum P is depicted in front of the vehicle body structure 14 and the bumper assembly 12. The pendulum P is a conventional part of testing equipment used to test bumper assemblies in response to an impact event, where the impact event is part of a controlled test conducted under predetermined and well known conditions. Specifically, such controlled tests include impacting the vehicle at a center of the front of the vehicle with the pendulum P. The pendulum P is configured to impact the front end of a vehicle in an area that is a predetermined distance above the ground simulating predetermined impact conditions of the controlled test. In some vehicle designs, energy absorbing members, such as the center of the first energy absorbing member 22, can be located above an, area of impact with the pendulum P. For example, some vehicle models can be sold or offered with large diameter wheels and raised configurations of the suspension systems, such as a four-wheel drive vehicle. In such raised configurations, the first energy absorbing member 22 can be located at a fixed distance above the ground that is greater than the predetermined distance of the controlled test. Consequently, the area of impact between the pendulum P and the first energy absorbing member 22 of a raised vehicle do not coincide. In such raised vehicles, the inclusion of the second energy absorbing member 24 in the bumper assembly 12 provides additional energy absorbing benefits. Specifically, the second energy absorbing member 24 is located in the area of impact between the pendulum P and the vehicle, body structure 14 thereby providing an energy absorbing structure that can respond to the controlled test receiving the impact of the pendulum P contacting the vehicle 10.

The vehicle body structure 14 (other than the elements of the vehicle bumper assembly 12) are conventional components that are well known in the art. Since vehicle body structures are well known in the art, these structures will not be discussed or illustrated in detail herein. Rather, it will be apparent to those skilled in the art, from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words, having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle bumper assembly 12. Accordingly, these terms, as utilized to describe the present invention should be interpreted relative to a vehicle equipped with the vehicle bumper assembly 12.

The term "configured" as used herein to describe a component, section or part of a device includes structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that, are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle bumper assembly, comprising:
    a first energy absorbing member made of non-expanded polypropylene configured to directly attach to a vehicle body structure, the first energy absorbing member having an upwardly facing surface, an outboard facing surface and a downwardly facing surface with portions of each defining a void forward of the vehicle body structure;
    a second energy absorbing member made of expanded polypropylene having an upper surface that is directly attached to a portion of the downwardly facing surface of the first energy absorbing member beneath the void and spaced apart from the vehicle body structure, the second energy absorbing member being located in its entirety below the void defined by the first energy absorbing member; and
    a vehicle facia member shaped and contoured for a predetermined vehicle body style and configured to attach to the vehicle body structure covering and at least partially concealing the first energy absorbing member and the second energy absorbing member.

2. The vehicle bumper assembly according to claim 1, wherein the second energy absorbing member is attached to the first energy absorbing member by a mechanical fastening structure.

3. The vehicle bumper assembly according to claim 2, wherein
    the mechanical fastening structure includes the first energy absorbing member having at least one slot and the second energy absorbing member having at least one clip that extends into the at least one slot.

4. The vehicle bumper assembly according to claim 1, wherein
    the second energy absorbing member is positioned between the first energy absorbing member and the vehicle facia member.

5. The vehicle bumper assembly according to claim 4, wherein
    the second energy absorbing member is dimensioned such that an inboard surface of the second energy absorbing member contacts the first energy absorbing member and an outboard surface of the second energy absorbing member contacts the vehicle facia member.

6. The vehicle bumper assembly according to claim 1, wherein
    the second energy absorbing member is attached to the first energy absorbing member by an adhesive material.

7. The vehicle bumper assembly according to claim 6, wherein
    the adhesive material includes a double-sided tape with adhesive on each opposing sides of the double sided tape.

8. The vehicle bumper assembly according to claim 1, wherein
    the first energy absorbing member exhibits a first compression characteristic and the second energy absorbing member exhibits a second compression characteristic such that the first compression characteristic exhibits greater rigidity that the second compression characteristic.

9. The vehicle bumper assembly according to claim 1, wherein
    the first energy absorbing member exhibits a compression yield strength of approximately 40 MPa in a compression yield strength test, and
    the second energy absorbing member exhibits a compression yield strength of between 0.10 MPa and 2.08 MPa in a compression yield strength test depending upon the density range of the expanded polypropylene, where the density range is between 20 g/l (grams per liter) to 90 g/l.

10. A vehicle bumper assembly, comprising:
    a first energy absorbing member made of non-expanded polypropylene configured to directly attach to a vehicle body structure;
    a second energy absorbing member made of expanded polypropylene having an upper surface that is directly attached to a portion of the first energy absorbing member spaced apart from the vehicle body structure;
    an air guiding member that includes a protruding segment, the second energy absorbing member including at least one laterally extending protrusion with the protruding segment of the air guiding member resting on the at least one laterally extending protrusion; and
    a vehicle facia member shaped and contoured for a predetermined vehicle body style and configured to attach to the vehicle body structure covering and at least partially concealing the first energy absorbing member and the second energy absorbing member.

11. The vehicle bumper assembly according to claim 10, wherein
    the first energy absorbing member includes an inboard facing surface attached to the vehicle body structure, an outboard facing surface facing the vehicle facia member and a downwardly facing surface below the outboard facing surface, and
    the second energy absorbing member is attached to the downwardly facing surface of the first energy absorbing member.

* * * * *